(12) United States Patent
Hacikyan

(10) Patent No.: US 9,341,300 B2
(45) Date of Patent: May 17, 2016

(54) INFLATABLE PURGE DAM APPARATUS

(76) Inventor: Michael Hacikyan, Amherst, NY (US)

( * ) Notice: Subject to any disclaimer, the term of this patent is extended or adjusted under 35 U.S.C. 154(b) by 746 days.

(21) Appl. No.: 13/457,761

(22) Filed: Apr. 27, 2012

(65) Prior Publication Data

US 2013/0284297 A1 Oct. 31, 2013

(51) Int. Cl.
*F16L 55/12* (2006.01)
*F16L 55/134* (2006.01)
*B23K 9/32* (2006.01)

(52) U.S. Cl.
CPC ............... *F16L 55/134* (2013.01); *B23K 9/326* (2013.01)

(58) Field of Classification Search
CPC .... F16L 55/134; F16L 55/1141; B23K 9/326; B23K 9/325; F16K 7/10
USPC ...................................... 138/93, 90
See application file for complete search history.

(56) References Cited

U.S. PATENT DOCUMENTS

| | | | | |
|---|---|---|---|---|
| 3,194,466 | A * | 7/1965 | Davis | 228/42 |
| 4,096,372 | A | 6/1978 | Hallenbeck | |
| 4,415,114 | A | 11/1983 | Hallenbeck | |
| 5,100,043 | A | 3/1992 | Hallenbeck | |
| 5,120,599 | A * | 6/1992 | Lewis | 442/329 |
| 5,187,343 | A * | 2/1993 | Edwards | 219/74 |
| 6,959,734 | B2 * | 11/2005 | Lundman | 138/93 |
| 2004/0144439 | A1 * | 7/2004 | Lundman | 138/93 |
| 2008/0251132 | A1 | 10/2008 | Bentley et al. | |
| 2012/0125600 | A1 | 5/2012 | Smith | |
| 2013/0260628 | A1 * | 10/2013 | Woods et al. | 442/184 |
| 2013/0284297 | A1 * | 10/2013 | Hacikyan | 138/93 |

FOREIGN PATENT DOCUMENTS

| | | | | |
|---|---|---|---|---|
| CA | 2304919 | * | 10/2007 | A41D 13/0512 |
| JP | H0871790 | | 3/1996 | |
| KR | 20090066759 | | 6/2009 | |
| KR | 20120018903 | | 3/2012 | |

OTHER PUBLICATIONS

Kipo, "International Search Report—Written Opinion of the International Searching Authority", Counterpart PCT Application No. PCT/US2013/037295, Nov. 21, 2013, 12 pages.
Arczone.com, "Purge Bladders Save Time and Money", 2006, 2 pages.

(Continued)

*Primary Examiner* — J. Casimer Jacyna
(74) *Attorney, Agent, or Firm* — Walter W. Duft

(57) ABSTRACT

An inflatable purge dam apparatus for use with pipes of different nominal pipe size (NPS) includes first and second inflatable purge bladders, and an intermediate bridge conduit. In a first aspect, the purge bladders each comprise an expandable inner purge gas retaining liner and a heat-resistant stretchable outer protective cover. The protective covers comprise a heat-resistant stretchable material that is constructed to undergo variable stretching to increase the size of the purge bladders as they are inflated with purge gas to a desired sealing pressure, thereby allowing the purge bladders to form an effective weld zone seal in pipes of different NPS. In a second aspect, an air vent conduit extends between first and second ports located proximate to a longitudinal centerline of the first purge bladder. The air vent conduit provides a vent pathway for venting air from the weld zone through the first purge bladder.

20 Claims, 6 Drawing Sheets

(56) References Cited

OTHER PUBLICATIONS

Weldwide Solutions, "Tandem Ring Purge System", at least as early as Apr. 27, 2012, 3 pages.
Huntingdon Fusion Technologies Limited, "Argweld Inflatable Pipe Purging System", Jan. 12, 2008, 2 pages.
Huntingdon Fusion Technologies Limited, "Argweld Single Exhaust Pipe Weld Purging Systems 2-6 Inch Pipework", Mar. 15, 2011, 2 pages.
Sumner Manufacturing Co., Inc., "Inflatable Weld Purge System", at least as early as Apr. 27, 2012, 2 pages.
Weldwide Solutions, "Inflatable Purge Systems", at least as early as Jan. 16, 2012, 4 pages.
Safety Main Stopper Co., Inc., "Inflatable Purge Dams", at least as early as Jan. 16, 2012, 2 pages.
Aquasol Corporation, "Purge Bladder: I-Purge Inflatable Purge Dam System", 2010, 6 pages, Jan. 16, 2012.

* cited by examiner

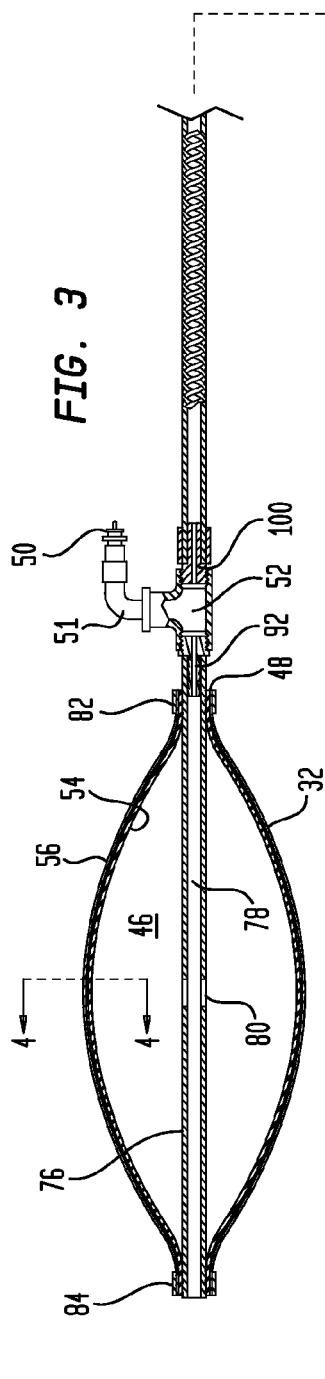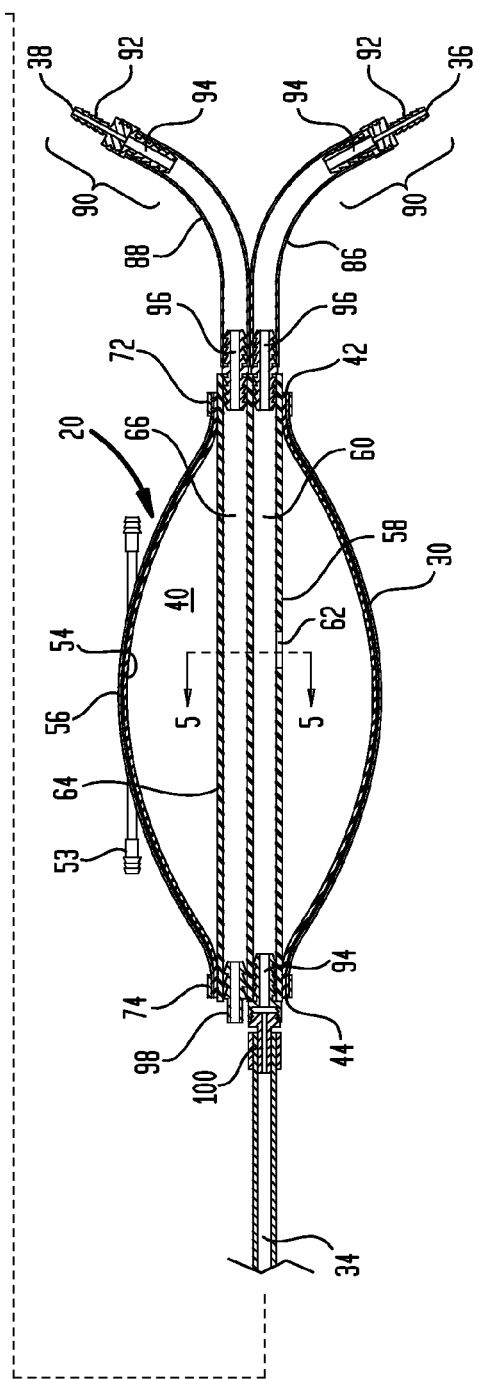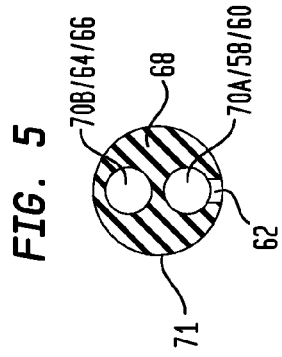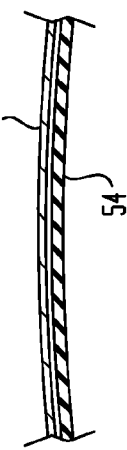

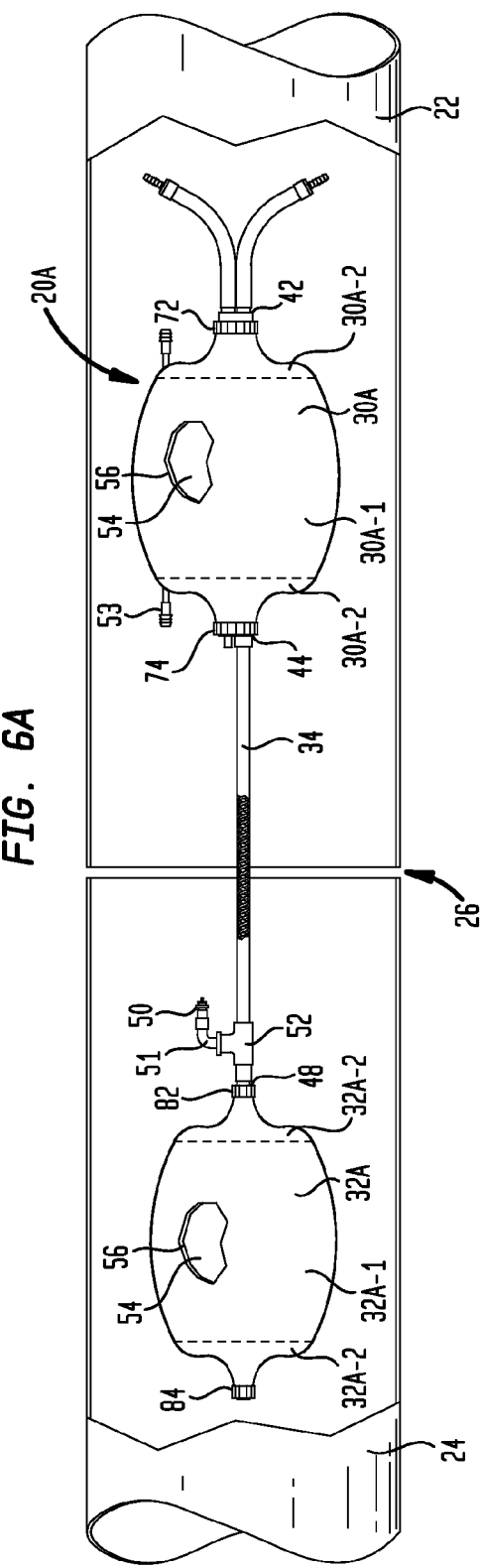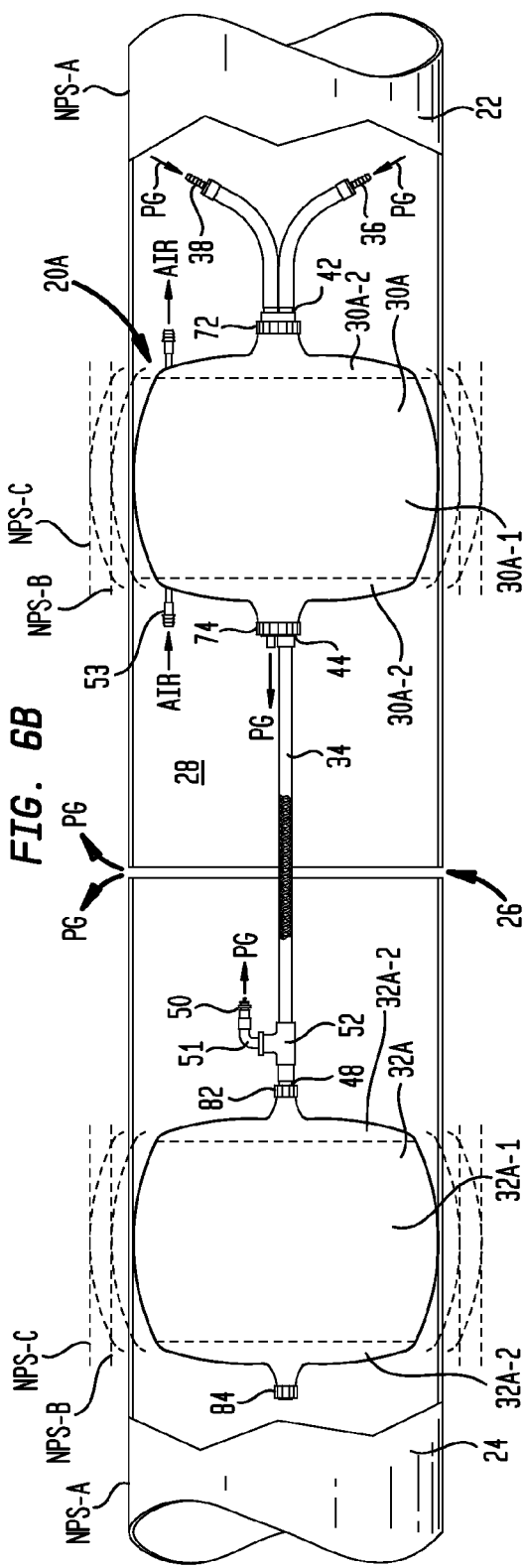

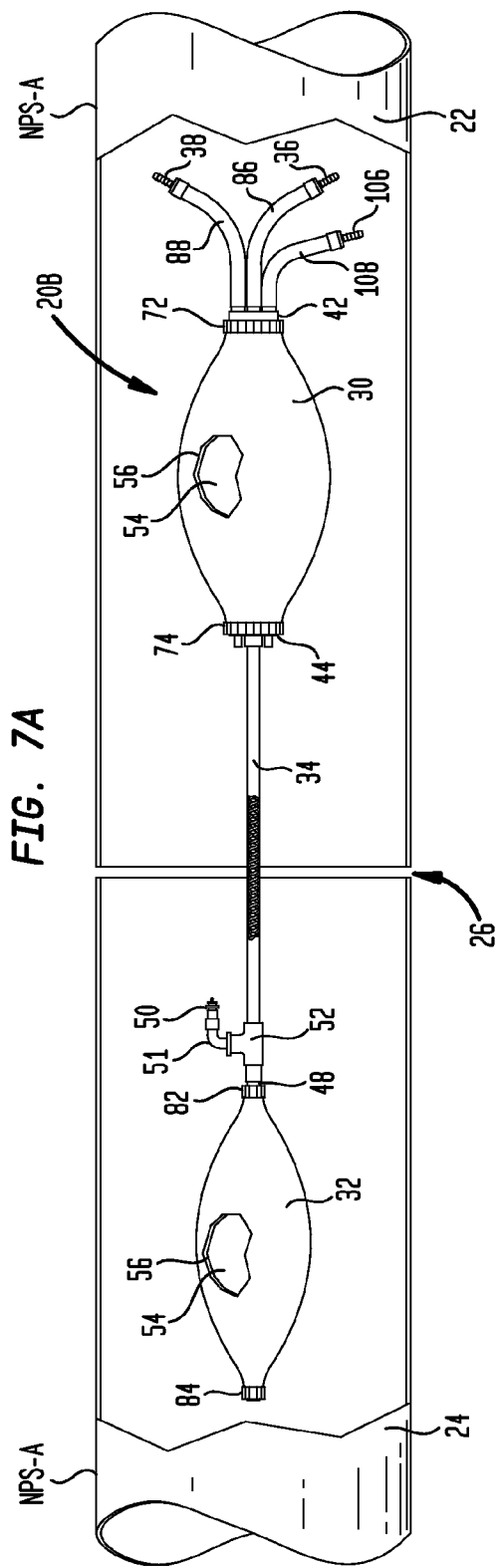
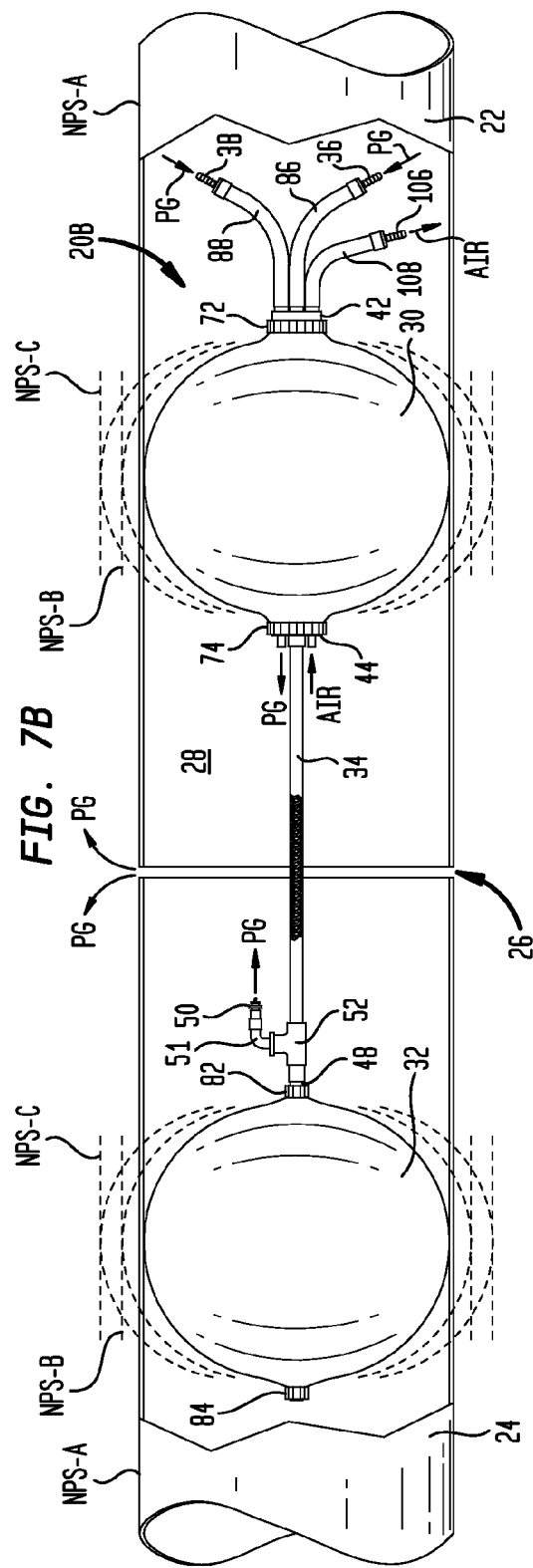

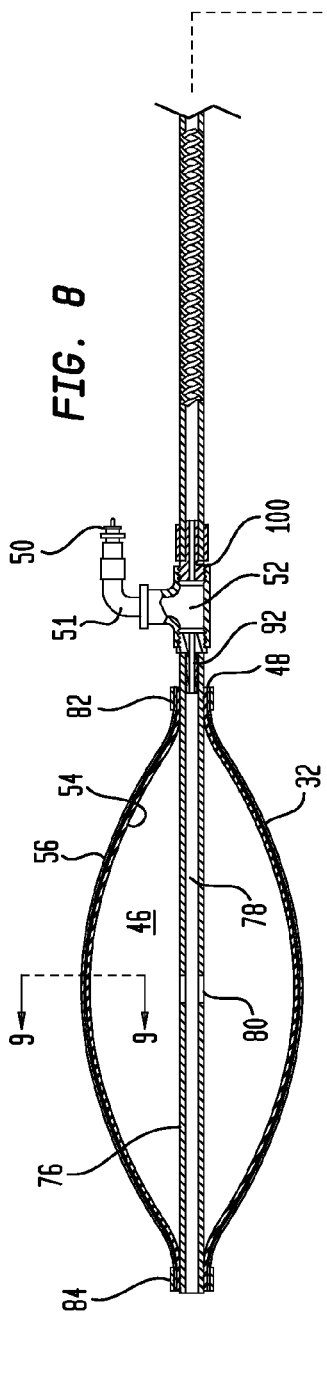
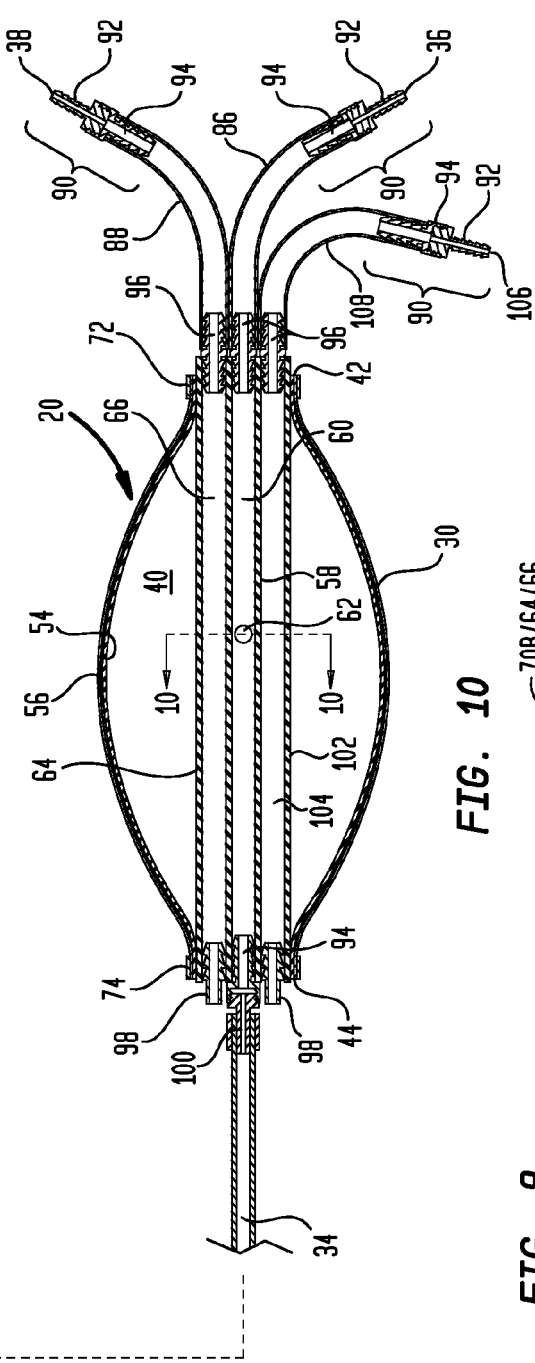
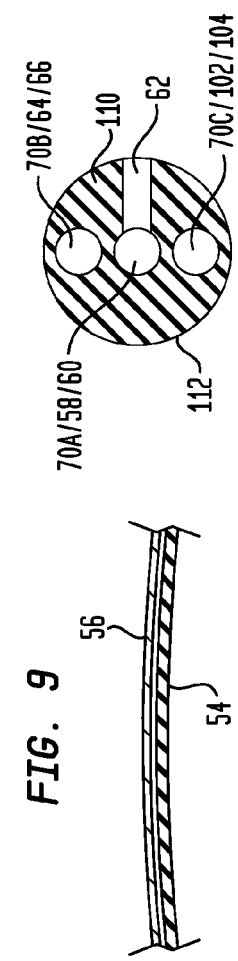
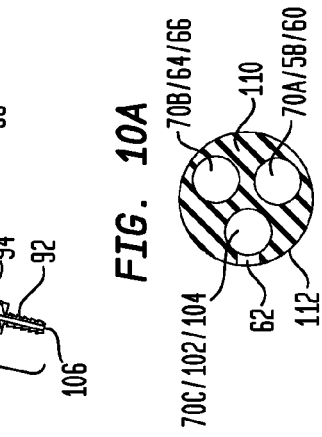

INFLATABLE PURGE DAM APPARATUS

BACKGROUND

1. Field

The present disclosure relates generally to inert gas welding. More particularly, the invention is directed to inflatable purge dams for retaining purge gas around a weld zone.

2. Description of the Prior Art

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding the ends of two pipe sections to form a consolidated pipe run, two purge dam structures are placed in the pipes, one in each pipe on either side of the weld zone. A purge gas can then be introduced into the area between the dams.

One well-known purging device used for pipe welding applications is the inflatable purge dam. As shown in FIG. 1, an inflatable purge dam typically include a pair of inflatable purge dam bladders 2 and 4 mounted on a purge gas delivery tube 6. The inflatable bladders usually comprise an inner bladder made from a resilient gas-impermeable material (such as latex rubber), and an outer protective cover made from fabric or other material (such as nylon) to protect the inner bladder from welding heat and caustic chemicals. The purge gas delivery tube is apertured inside the inflatable bladders so that the bladders will inflate when a purge gas "PG" is introduced. The purge gas delivery tube includes a pressure-sensitive gas discharge valve 8 located in the weld zone 10 that exists between the bladders. The discharge valve is designed to open when the purge gas reaches a predetermined pressure that is sufficient to inflate the bladders and ensure that the bladders form effective weld zone seals with the inside walls of the pipes to be welded. Once the weld zone seals have been formed, the discharge valve will open, thereby releasing purge gas into the weld zone. An air vent tube 12 typically extends through an outside portion of one of the bladders. The vent tube vents air from the weld zone as it is displaced by the purge gas, and may be connected to oxygen monitoring equipment for monitoring the oxygen content within the weld zone.

Conventional inflatable purge dam devices as described above are designed for use with pipe installations having a specific nominal pipe size (NPS). Although such devices may work satisfactorily with several different pipe schedules within a single NPS (e.g., by relaxing the purge gas pressure to partially deflate the purge bladders as the pipe wall thickness increases and the inside diameter decreases), they are not intended to work over a range of NPSes. For example, applicants have observed that a conventional inflatable purge dam designed for pipes having an NPS of 3 inches may well be able to handle pipe schedules 10, 40, 60 and 80, but will not be usable with pipes having an NPS of 2 inches or 4 inches. Applicants have further observed that conventional inflatable purge dams as described above may allow oxygen leakage into the weld zone around the outside of the inflatable bladder that carries the vent tube 12. It appears to applicants that this is due to the vent tube rippling or otherwise distorting the outer surface of the bladder where it seals against the inside pipe wall.

Accordingly, applicants submit that there is presently a need for improvement in the construction of inflatable purge dam. What is required in particular is an inflatable purge dam apparatus that can be used with a range of pipe sizes and/or does not leak in the vicinity of a vent tube.

SUMMARY

Embodiments of an improved inflatable purge dam apparatus are disclosed. In one aspect, the purge dam apparatus may be constructed may be constructed for use with pipes of different nominal pipe size (NPS). In another aspect, the purge dam apparatus may be constructed so as to be resistant to oxygen leakage around the outside of the purge bladders. If desired, both of the above features may be provided in a single device. Alternatively, the features could be separately provided in different devices.

Each embodiment has first and second inflatable purge bladders joined by a bridge conduit. The first purge bladder has a first interior gas-receiving chamber and defines a first port on one side thereof and a second port on another side thereof, with the first port and the second port being aligned proximate to a central longitudinal axis of the first purge bladder. The second purge bladder has a second interior gas-receiving chamber and defines a third port on one side thereof, with the third port being aligned proximate to a central longitudinal axis of the second purge bladder. The bridge conduit extends between the second port on the first purge bladder and the third port on the second purge bladder, and provides fluid communication between the first gas-receiving chamber and the second gas-receiving chamber. The bridge conduit has a pressure-sensitive gas discharge valve operable to release a purge gas into a weld zone formed between the first purge bladder and the second purge bladder when the purge bladders have been inflated with the purge gas to a predetermined sealing pressure that is effective to seal the weld zone.

In a first aspect of the disclosed subject matter, the inflatable purge dam apparatus is characterized by the first purge bladder and the second purge bladder each comprising an expandable inner purge gas retaining liner and a heat-resistant stretchable outer protective cover. The protective covers comprise a stretchable material that is more heat-resistant than a material used for the gas retaining liners. The stretchable material is constructed to undergo variable stretching to increase the size of the first purge bladder and the second purge bladder as they are inflated with the purge gas to the desired sealing pressure. This variable stretching is sufficient to allow the first purge bladder and the second purge bladder to form an effective weld zone seal at the desired sealing pressure in pipes of different NPS.

In a second aspect of the disclosed subject matter, the inflatable purge dam apparatus is characterized by the presence of an air vent conduit extending between the first port on the first purge bladder and the second port on the first purge bladder. The air vent conduit provides an air vent pathway through the first gas-receiving chamber for venting air from the weld zone through the first purge bladder while maintaining fluid separation from the first gas-receiving chamber. In an example embodiment, a first inflation purge gas conduit and/or an auxiliary purge gas conduit may also extend substantially adjacent to the air vent conduit between the first port on the first purge bladder and the second port on the first purge bladder. In an example embodiment, the various conduits extending through the first purge bladder may be provided by a multiple passage conduit having separate passages providing the various conduits and pathways. The multiple passage conduit may comprise a generally circular outer surface, and the first purge bladder may be mounted to the generally circular outer surface at the bladder's first and second ports.

BRIEF DESCRIPTION OF THE DRAWINGS

The foregoing and other features and advantages will be apparent from the following more particular description of example embodiments, as illustrated in the accompanying Drawings, in which:

FIG. 3 is a cross-sectional centerline view of the inflatable purge dam apparatus of FIGS. 2A and 2B;

FIG. 4 is a cross-sectional view taken along line 4-4 in FIG. 3;

FIG. 5 is a cross-sectional view taken along line 5-5 in FIG. 3;

FIG. 6A is a side elevation view showing another example embodiment of an inflatable purge dam apparatus in a deflated condition;

FIG. 6B is a side elevation view showing the inflatable purge dam apparatus of FIG. 5A in an inflated condition;

FIG. 7A is a side elevation view showing another example embodiment of an inflatable purge dam apparatus in a deflated condition;

FIG. 7B is a side elevation view showing the inflatable purge dam apparatus of FIG. 7A in an inflated condition;

FIG. 8 is a cross-sectional view taken generally along the centerline of the inflatable purge dam apparatus of FIGS. 7A and 7B;

FIG. 9 is a cross-sectional view taken along line 9-9 in FIG. 8;

FIG. 10 is a cross-sectional view taken along line 10-10 in FIG. 8; and

FIG. 10A is cross-sectional view showing an alternative to the construction of FIG. 10.

DETAILED DESCRIPTION OF EXAMPLE EMBODIMENTS

Figure 1:
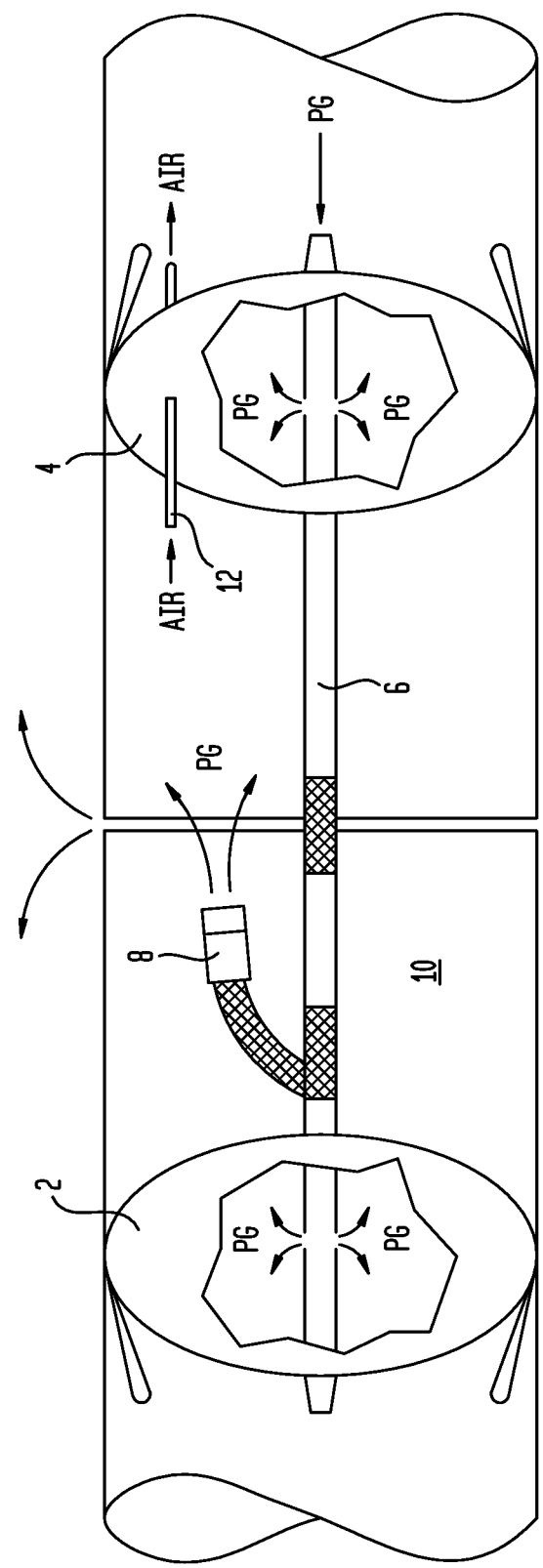
FIG. 1 is a side elevation view showing a prior art inflatable purge dam apparatus.
Figure 2A:
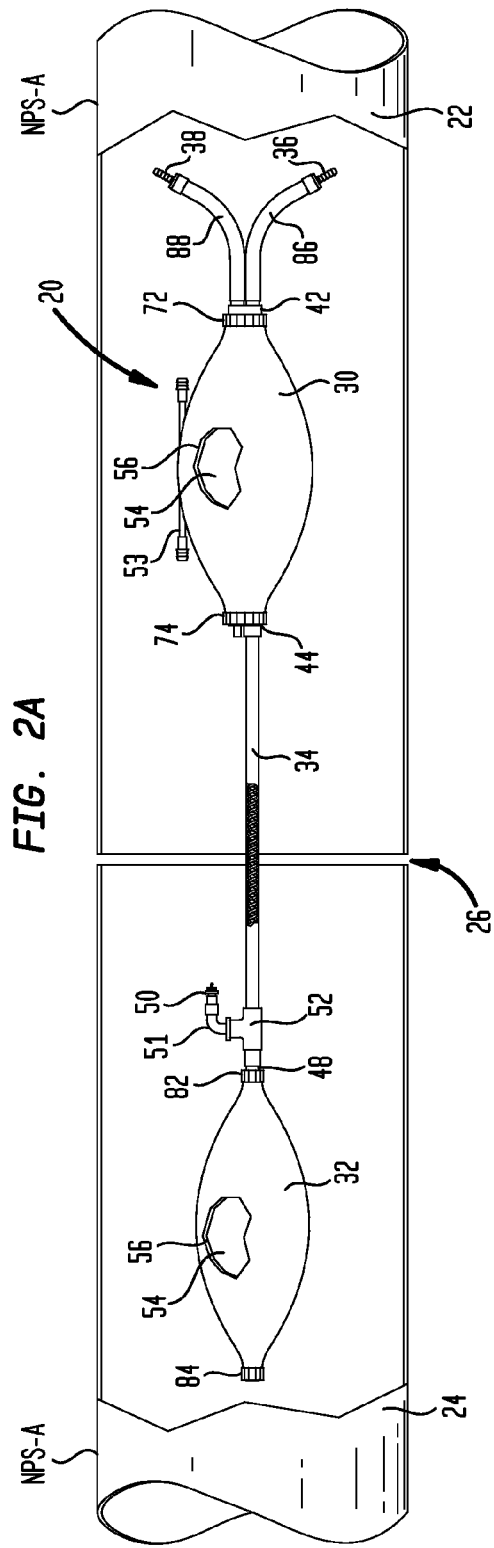
FIG. 2A is a side elevation view showing an example embodiment of an inflatable purge dam apparatus in a deflated condition.
Figure 2B:
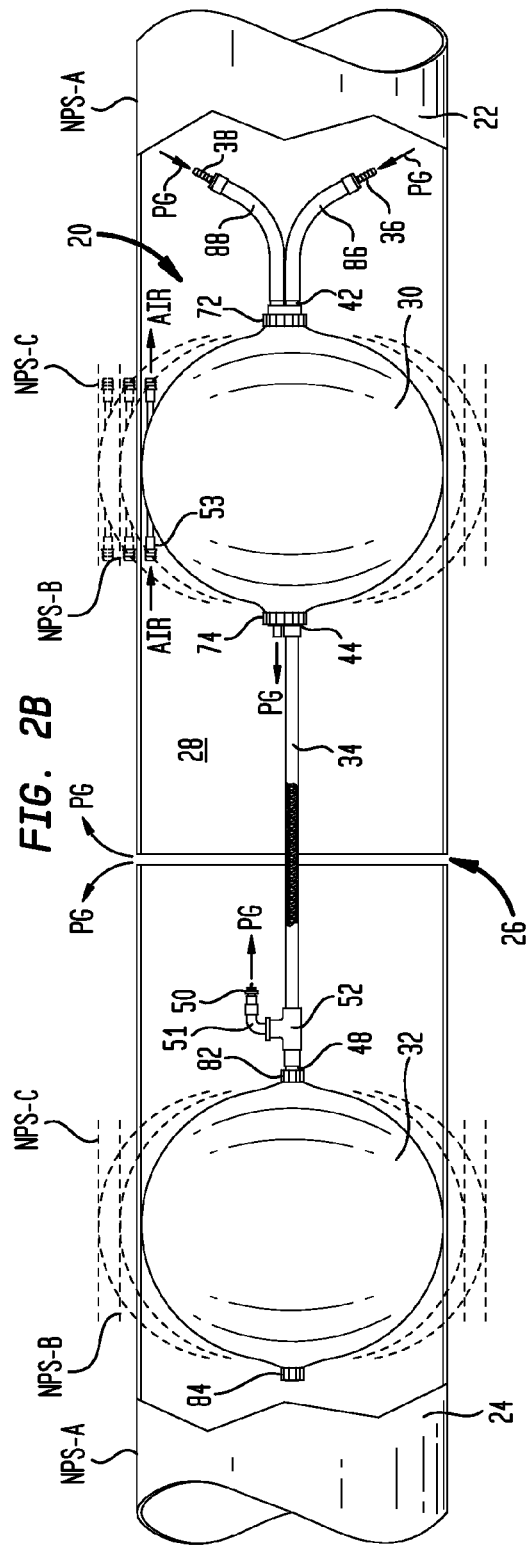
FIG. 2B is a side elevation view showing the inflatable purge dam apparatus of FIG. 2A in an inflated condition.

Turning now to the drawing figures, which are not necessarily to scale, like reference numbers are used to represent like elements in all of the several views. In FIGS. 2A and 2B, an example inflatable purge dam apparatus 20 is disposed inside a pair of pipes 22 and 24 that are to be butt-welded together at a welding root gap 26. The purge dam apparatus 20 has first and second inflatable purge bladders 30 and 32 that are joined together by an intermediate bridge conduit 34. FIG. 2A shows the purge dam apparatus 20 in a deflated condition following installation in the pipes 22/24 but prior to inflation of the purge bladders 30/32. FIG. 2B shows the purge dam apparatus 20 after the purge bladders 30/32 have been inflated with a purge gas PG. The enclosed space between the purge bladders 30/32 represents a weld zone 28 that has been purged of air by the purge gas following the introduction thereof through an optional inflation purge gas entry port 36 and possibly an optional auxiliary purge gas entry port 38.

With additional reference now to FIG. 3, the first purge bladder 30 has a first interior gas-receiving chamber 40 and defines a first port 42 on one side thereof and a second port 44 the opposite side thereof. The first port 42 and the second port 44 are aligned proximate to a central longitudinal axis of the first purge bladder 30. The second purge bladder 32 has a second interior gas-receiving chamber 46 and defines a third port 48 on one side thereof. The third port 48 is aligned proximate to a central longitudinal axis of the second purge bladder 32. Example materials that may be used to construct the first and second purge bladders 30/32 are described in more detail below.

The bridge conduit 34 extends between the second port 44 on the first purge bladder 30 and the third port 48 on the second purge bladder 32. The bridge conduit 34 provides fluid communication between the first gas-receiving chamber 40 of the first purge bladder 30 and the second gas-receiving chamber 46 of the second purge bladder 32. It may be constructed from any suitable conduit material, such as a braided hose or the like. Near its left-hand end, the bridge conduit 34 has a pressure-sensitive gas discharge valve 50. The gas discharge valve 50 is mounted at the end of an elbow 51 that is threaded into a three-way T-fitting 52 that is mounted to, and forms a part of, the bridge conduit 34. The elbow 51 and the T-fitting 52 may be constructed from any suitable metal or non-metal material. The gas discharge valve 50 is operable to release purge gas into the weld zone 28 when the first and second purge bladders 30/32 have been inflated (by the purge gas) to a predetermined sealing pressure that is effective to seal the weld zone. In particular, the gas discharge valve 50 may be set to open at the minimum pressure that will allow the first and second purge bladders 30/32 to fully inflate and form an adequate seal against the inside walls of the pipes 22 and 24. If the purge dam apparatus 20 is to be used with several different pipe sizes (as discussed below), the opening pressure of the gas discharge valve 50 may be set according to the smallest pipe inside diameter for which the apparatus is designed to be used. This will be the pipe having the smallest NPS and the largest contemplated pipe schedule for that NPS. If it is then desired to inflate the first and second purge bladders 30/32 to a larger size, the flow rate of the purge gas PG may be increased beyond the flow capacity of the gas discharge valve 50, thereby increasing the purge gas pressure within the bladders.

An air vent tube 53 extends through the outer peripheral portion of the first purge bladder 30 in order to provide an air pathway for venting air from the weld zone 28. As is conventional, the air vent tube 53 may be situated between inner and outer layers of the first and second purge bladders 30/32 (such as between the purge bladder liner 54 and the cover element 56 described in the next paragraph). Alternatively, as described in more detail below in connection with FIGS. 7A, 7B and 8, an alternative air venting arrangement could be used.

According to one aspect of the disclosed subject matter, the first and second purge bladders 30/32 may each comprise an expandable inner purge gas retaining liner 54 and a heat-resistant stretchable outer protective cover 56. These purge bladder components are shown in FIGS. 2A, 3 and 4. The gas retaining liners 54 can be made from a resilient, substantially gas impermeable material, such as latex rubber. The protective covers 56 can be made from a stretchable material that is more heat-resistant than the material used for the gas retaining liners 54. By way of example only, the protective covers can be made from a stretch fabric that is preferably at least as temperature resistant as the nylon material used in the outer covers of existing purge bladders (which has a melt point of approximately 180°), but with more stretch capability. Suitable stretch fabrics include woven, non-woven or knitted products in the elastic fabric class whose constituents may be inherently heat retardant or which have possibly been treated with a heat retardant material. Using such stretchable materials, it will be possible to inflate the first and second purge bladders 30/32 with purge gas to an effective sealing pressure in which the outer protective covers 56 are substantially substantially taught and wrinkle free, and to thereafter further inflate the purge bladders to a larger size due to the stretchable material undergoing variable (elastic) stretching. In this way, the first and second purge bladders 30/32 may be inflated to an operational purging configuration wherein the purge bladders are shaped and sized to form an effective weld zone seal in pipes having a first NPS, or alternatively, the purge bladders may be expanded for use in pipes having a second (larger) NPS by inflating them to a higher pressure that variably stretches the outer protective covers 56. This variable stretching will be sufficient to allow the first and second purge bladders 30/32 to form an effective weld zone seal at the desired sealing pressure in pipes of two or more different NPSes. For example, in FIG. 2B, the first and second purge bladders 30/32 seat against pipes 22 and 24 having a hypothetical nominal pipe size of NPS-A, but may be further expanded for use with one or more larger pipe sizes, such as the hypothetical nominal pipe sizes designated as NPS-B and NPS-C, or greater. Insofar as the stretchable material is elastic in nature, the outer protective covers 56 will always return to a non-stretch condition following purge bladder deflation, allowing repeated usage of the first and second purger bladders 30/32 in pipes of different NPS.

It should be noted that the ability to variably stretch the first and second purge bladders 30/32 is in contrast to the prior art practice of partially deflating a pair of non-stretchable purge bladders to accommodate different schedules within a single NPS. Such partial deflation not only reduces the size of the purge bladders, but also changes their shape and/or surface configuration (e.g., by wrinkling the outer covers). This can compromise the weld zone seal by reducing the purge bladder inflation level below the sealing pressure needed to form an effective weld zone seal. Moreover, as far as known, the partial deflation technique does not allow the prior art non-stretchable purge bladders to be used with pipes of different NPS.

For any given stretchable material having a given stretch capability, it may be expected that larger purge bladders will be usable with a greater number of pipe sizes than smaller purge bladders. This is due to the larger bladders having more surface area than the smaller purge bladders. For example, as shown in Table I below, the smaller purge bladders A-C designed for pipe sizes no larger than NPS 10 may be able to accommodate two different NPSes, whereas the larger purge bladders D-E designed for pipe sizes of NPS 12 and above may be able to accommodate three or four different NPSes.

TABLE I

| PURGE BLADDER | NPS SIZE RANGE |
| --- | --- |
| A | 3-4 |
| B | 5-6 |
| C | 8-10 |
| D | 12-14-16 |
| E | 18-20-22-24 |

Assuming each NPS size range of Table I encompasses a schedule 80 pipe at the smallest NPS (representing the smallest inside diameter) and a schedule 10 pipe at the largest NPS (representing the largest inside diameter), the percentage of diameter increase within any given NPS size range may lie between approximately 25-55%. In that case, a stretchable material having a corresponding stretch capability of 25-55% will allow the purge dam apparatus 20 to accommodate NPS ranges such as those shown in Table 1. It will be appreciated that purge bladders with other size range capabilities (i.e., larger or smaller) could be provided by using different stretchable materials having different stretch ranges (e.g., stretch ranges that extend lower than 25% and/or higher than 55%).

Table I illustrates an important advantage of using a stretchable purge bladder design, namely, that the number of different purge bladder sizes required to accommodate a given range of pipe sizes is less than the larger number of purge bladder sizes that would be required using a non-stretchable prior art design. In particular, in a prior art inflatable purge dam apparatus whose outer purge bladder covers are made from a substantially non-stretchable material, such as nylon, the number of different purge bladder sizes required to accommodate pipes sizes between NPS 3-24 would be as shown in Table II below.

TABLE II

| PURGE BLADDER | NPS SIZE RANGE |
| --- | --- |
| A | 3 |
| B | 4 |
| C | 5 |
| D | 6 |
| E | 8 |
| F | 10 |
| G | 12 |
| H | 14 |
| I | 16 |
| J | 18 |
| K | 20 |
| L | 22 |
| M | 24 |

Returning now to FIG. 3, the purge dam apparatus 20 may optionally include a first inflation purge gas conduit 58 that extends between the first port 42 and the second port 44 on the first purge bladder 30. If present, the first inflation purge gas conduit 58 provides a first inflation purge gas pathway 60 through the first gas-receiving chamber that may be used for conducting a purge gas PG through and into the first gas-receiving chamber 40. To that end, the first inflation purge gas conduit 58 may be apertured (with one or more apertures 62) to allow the purge gas therein to flow into the first gas-receiving chamber 40 in order to inflate the first purge bladder 30.

In addition to the first inflation purge gas conduit 58, an optional auxiliary purge gas conduit 64 may be included in the purge dam apparatus 20. If present, the auxiliary purge gas conduit 64 may extend substantially parallel and adjacent to the first inflation purge gas conduit 58 between the first port 42 and the second port 42 on the first purge bladder 30. The auxiliary purge gas conduit 64 provides an auxiliary purge gas pathway 66 for increasing the flow of purge gas PG into the weld zone 40. This can be useful for expediting the purging process, especially in large pipes. The auxiliary purge gas conduit 64 is not apertured, such that all purge gas therein is delivered to the weld zone 40, and does not enter the first gas-receiving chamber 40.

As can be seen in FIG. 5, the first inflation purge gas conduit 58 and the auxiliary purge gas conduit 64 may be provided by a dual passage conduit 68 having a first passage 70A providing the first inflation purge gas conduit 58 and its first inflation purge gas pathway 60, and a second passage 70B providing the auxiliary purge gas conduit 64 and its auxiliary purge gas pathway 66. Note that the first passage 70A has one or more openings to provide the one or more apertures 62 of the first inflation purge gas conduit 58. The dual passage conduit 68 may be formed from a suitable rubber material, and may comprise a generally circular outer surface 71. The first purge bladder 30 may be mounted to the generally circular outer surface 71 of the dual passage conduit 68 at the bladder's first and second ports 42 and 44. For example, as can be seen in each of FIGS. 2A, 2B and 3, crimp anchors 72 and 74 may be used to respectively crimp the right-hand and left-hand port-defining portions of the first purge bladder 30 onto the dual passage conduit's outer surface 71. The crimp anchors 72 and 74 can be made from a metal such as copper, or from any other suitable material.

With continuing reference to FIG. 3, an optional second inflation purge gas conduit 76 may be further included in the purge dam apparatus 20. If present, the second inflation purge gas conduit 76 may extend wholly or partially between the third port 48 on the second purge bladder 32 and an opposite side of the bladder. The second inflation purge gas conduit 76 can be made from any suitable conduit material, such as a suitable rubber. It provides a second inflation purge gas pathway 78 that may be used for conducting a purge gas into the second gas-receiving chamber 46. To that end, the second inflation purge gas conduit 76 may be apertured (with one or more apertures 80) to allow a purge gas therein to flow into the second gas-receiving chamber 46 to inflate the second purge bladder 32. The second inflation purge gas conduit 76 may or may not extend all the way to the far side of the second purge bladder 32. If it does, the far end of the second inflation purge gas conduit 76 may be capped to prevent the purge gas from escaping beyond the second purge bladder 32. The second inflation purge gas conduit 76 may be generally circular in shape, and the second purge bladder 32 may be mounted to the generally circular outer surface thereof at the bladder's third port 48 and at the opposite side of the bladder. For example, as shown in each of FIGS. 2A, 2B and 3, crimp anchors 82 and 84 may be used to respectively crimp the right-hand port-defining portion of the second purge bladder 32 as well as the opposite left-hand side thereof onto the second inflation purge gas conduit's outer surface. Like the crimp anchors 72 and 74 discussed above, the crimp anchors 82 and 84 can be made from a suitable metal or non-metal material.

As shown in FIGS. 2A, 2B and 3, the first inflation purge gas conduit 58, the bridge conduit 34, and the second inflation purge gas conduit 76 may carry a purge gas PG introduced at the inflation purge gas entry port 36 to inflate the first and second purge bladders 30/32, and to thereafter fill the weld zone 28 once the gas discharge valve 50 opens. As previously stated, however, the first inflation purge gas conduit 58 and the second inflation purge gas conduit 76 are merely optional. If these conduits are not used, a purge gas PG could still flow through the first gas receiving chamber 40, through the bridge conduit 34, and into the second gas-receiving chamber 46, albeit perhaps not as efficiently. It should also be understood that the first inflation purge gas conduit 58, the bridge conduit 34, and the second inflation purge gas conduit 76 may be implemented using separate conduits that are joined together, or may represent different portions of a single conduit, etc.

As previously stated, the auxiliary gas conduit 64, which is also merely optional, is adapted to deliver auxiliary purge gas PG directly into the weld zone 28. It will appreciated that eliminating the auxiliary purge gas conduit 64 may reduce the efficiency of the purge dam apparatus 20, but nonetheless represent a viable design alternative for some purging applications. The auxiliary purge gas may be introduced via the previously-mentioned auxiliary purge gas entry port 38. Both the inflation purge gas entry port 36 and the auxiliary purge gas entry port 38 may be connected to a common purge gas supply, or to separate purge gas supplies. If desired, the inflation purge gas entry port 36 may be provided at the end of an optional inflation purge gas delivery tube 86 whose other end connects to the right-hand end of the inflation purge gas conduit 58. The auxiliary purge gas entry port 38 may be provided at the end of an optional auxiliary purge gas delivery tube 88 whose other end connects to the right-hand end of the auxiliary purge gas conduit 64.

Many different types of connection members may be used to assemble the various conduits, tubes and other components of the inflatable purge dam apparatus 20. Such connection members can be made from a wide variety of materials, including metals and non-metals. For example, starting from the right-hand side of FIG. 3, the inflation purge gas entry port 36 and the auxiliary purge gas entry port 38 may each be provided by two-piece, double-ended barbed fitting 90 comprising a male-threaded, single-ended barbed fitting 92 connected to a female-threaded, single-ended barbed fitting 94. Moving further to the left in FIG. 3, the inflation purge gas delivery tube 86 and the auxiliary purge gas delivery tube 88 can be respectively connected to the right-hand end of the first inflation purge gas conduit 58 and the right-hand end of the auxiliary purge gas conduit 64 using double-ended barbed fittings 96. Continuing leftward in FIG. 3, the left-hand end of the auxiliary purge gas conduit 64 may be fitted with single-ended barbed fitting 98, but this is optional. The left-hand end of the first inflation purge gas conduit 58 may be fitted with a female-threaded, single-ended barbed fitting 94 (as used in the double-ended barbed fitting 90 described above). A male-threaded fitting 100 may be crimped onto the right-hand end of the bridge conduit 34, and this fitting may be connected to the female-threaded barbed fitting 94 fitted on the left-hand end of the first inflation purge gas conduit 58. Moving further leftward in FIG. 3, another male-threaded fitting 100 may be crimped onto the left-hand end of the bridge conduit 34, and this fitting may be connected to a female-threaded right-hand side of the T-fitting 52. The left-hand side of the T-fitting 52 may also be female threaded. A male-threaded single-ended barbed fitting 92 (as used in the double-ended barbed fitting 90 discussed above) may be inserted into the right-hand end of the second inflation purge gas conduit 76 and threaded into the female-threaded left-hand side of the T-fitting 52. It will be appreciated that many other types of fittings and connectors may be used to assemble the inflatable purge dam apparatus 20, and that the components shown in FIG. 3 are merely one example thereof.

Turning now to FIGS. 6A and 6B, the inflatable purge dam apparatus 20 is shown in an alternative construction 20A. In this construction, all components are the same as described above, except for the first and second purge bladders, which are respectively identified by reference numerals 30A and 32A. The first and second purge bladders 30A/32A differ from the first and second purge bladders 30/32 described above insofar as they include an outer cover 56 that comprises both stretchable and non-stretchable material. In particular, only central circumferential portions 30A-1 and 32A-1 of the first and second purge bladders 30A and 32A comprise a stretchable material, such as a stretchable fabric as previously described. The side portions 30A-2 and 32A-2 comprise a non-stretchable material, such as a nylon fabric that might be used in a prior art inflatable purge dam apparatus. In this way, only the central circumferential portions 30A-1 and 32A-1 of the purge bladders 30A and 32A will stretch as the purge bladders are inflated. However, this will still be effective to enable the purge bladders 30A and 32A to accommodate different pipe sizes. For example, in FIG. 6B, the first and second purge bladders 30A/32A seat against pipes 22 and 24 having a hypothetical nominal pipe size of NPS-A, but may be further expanded for use with one or more larger pipe sizes, such as the hypothetical nominal pipe sizes designated as NPS-B and NPS-C, or greater.

According to another aspect of the disclosed subject matter, the purge dam apparatus 20 may, in addition to accommodating pipes of different size, or as an entirely alternative feature, be designed to eliminate the problem of oxygen leakage into the weld zone 28 due to the presence of the air vent tube 53 extending through the periphery of the first purge bladder 30. As described in the Background section above, applicants have observed that this problem appears to arise from placement of the vent tube near the purge bladder outer circumference, which can produce rippling or other distortions that disrupt the seal with the inside pipe wall.

To address the problem, the purge dam apparatus 20 may be modified by routing an air vent conduit (that provides an air vent pathway) through an interior portion of the first purge bladder 30, i.e., within the gas-receiving chamber 40 rather than outside of it. One example of such a configuration is shown in the alternative construction 20B of FIGS. 7A, 7B and 8. In the construction 20B, all components are the same as described above in connection with the original purge dam apparatus 20, except that the air vent tube 53 is replaced with a central air vent conduit 102 (see FIG. 8) that extends between the first port 42 and the second port 44 on the first purge bladder 30. The air vent conduit 102 provides an air vent pathway 104 that may be used for venting air from the weld zone 28 through the first purge bladder 30 while maintaining fluid separation from the first gas-receiving chamber 40. As previously described, the ports 42 and 44 are aligned proximate to a central longitudinal axis of the purge bladder 30, and are relatively distant from the outer circumference thereof. Thus, the air vent conduit 102 should not in any way interfere with good sealing between the first purge bladder 30 and the inside wall of pipe 22. In FIG. 8, air enters the left-hand end of the vent air conduit 102 within the weld zone 28. At this air entry point, the same type of single-ended barbed fitting 98 that is optionally fitted on the left-hand end of the auxiliary purge gas conduit 64 may be optionally fitted on the left-hand end of the air vent conduit 102. The air vent conduit 102 may be adapted to vent air from the weld zone 28 via an optional air vent port 106 as the air in the weld zone is displaced by the purge gas. The air vent port 106 can be optionally provided at the end of an air vent tube 108 whose other end connects to the right-hand end of the air vent conduit 102. Various types of connection members (made from any suitable materials) may be used to implement the air vent port 106 and the air vent tube 108. For example, as can be seen in FIG. 8, the air vent port 106 may be provided using another two-piece, double-ended barbed fitting 90 that comprises the male-threaded, single-ended barbed fitting 92 connected to the female-threaded, single-ended barbed fitting 94. Another double-ended barbed fitting 96 may be used to connect the left-hand end of the air vent tube 108 to the right-hand end of the vent air conduit 102.

As shown in FIGS. 7A, 8 and 9, the first and second purge bladders 30/32 of the construction 20B may be fabricated with the expandable inner purge gas retaining liner 54 and the heat-resistant stretchable outer protective cover 56, as described above. Alternatively, the first and second purge bladders 30/32 could be fabricated with a substantially non-stretchable outer cover material, such as nylon.

As was the case with the purge dam apparatus 20, the various purge gas conduits 58, 64 and 76 are optional. However, when either one or both of the first inflation purge gas conduit 58 or the auxiliary purge gas conduit 64 are provided in combination with the air vent conduit 102, they may be collectively implemented using a multiple passage conduit. For example, as shown in FIG. 10, the first inflation purge gas conduit 58, the auxiliary purge gas conduit 64, and the air vent conduit 102 may be provided by a triple passage conduit 110 having a first passage 70A providing the first inflation purge gas conduit 58 its first inflation purge gas pathway 60, a second passage 70B providing the auxiliary purge gas conduit 64 its auxiliary purge gas pathway 66, and a third passage 70C providing the air vent conduit 102 its air vent pathway 104. Note that the first passage 70A has one or more openings to provide the one or more apertures 62 of the first inflation purge gas conduit 58. The triple passage conduit 110 may be formed from a suitable rubber material, and may comprise a generally circular outer surface 112. The first purge bladder 30 may be mounted to the generally circular outer surface 71 of the dual passage conduit 68 at the bladder's first and second ports 42 and 44. For example, as additionally shown in FIGS. 7A and 7B, a larger version of the crimp anchors 72 and 74 shown in FIGS. 2A, 2B and 3 may be used to respectively crimp the right-hand and left-hand port-defining portions of the first purge bladder 30 onto the triple passage conduit's outer surface 112. As shown in FIG. 10A, the diameter of the triple passage conduit 110 may be reduced by arranging the passages 70A, 70B and 70C in a non-linear triangular configuration.

Accordingly, an inflatable purge dam apparatus has been disclosed. While various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An inflatable purge dam apparatus for use with pipes of different nominal pipe size (NPS), comprising:
   a first inflatable purge bladder having a first interior gas-receiving chamber and defining a first port on one side thereof and a second port on another side thereof, said first port and said second port being aligned proximate to a central longitudinal axis of said first purge bladder;
   a second inflatable purge bladder having a second interior gas-receiving chamber and defining a third port on one side thereof, said third port being aligned proximate to a central longitudinal axis of said second purge bladder;
   a bridge conduit extending between said second port on said first purge bladder and said third port on said second purge bladder, said bridge conduit providing fluid communication between said first gas-receiving chamber and said second gas-receiving chamber;
   said bridge conduit having a pressure-sensitive gas discharge valve operable to release a purge gas into a weld zone formed between said first purge bladder and said second purge bladder when said first purge bladder and said second purge bladder have been inflated with said purge gas to a predetermined sealing pressure that is effective to seal said weld zone;
   said first purge bladder and said second purge bladder each comprising an expandable inner purge gas retaining liner and a heat-resistant stretchable outer protective cover;
   said protective covers comprising a stretchable material that is more heat-resistant than a material used for said gas retaining liners, said stretchable material being constructed to undergo variable stretching to increase a size of said first purge bladder and said second purge bladder as they are inflated with said purge gas to said sealing pressure; and said variable stretching being sufficient to allow said first purge bladder and said second purge bladder to form an effective weld zone seal at said sealing pressure in pipes of different NPS.

2. The purge dam apparatus of claim 1, wherein said stretchable material is disposed to provide stretchable circumferential pipe-contacting regions of said protective covers.

3. The purge dam apparatus of claim 2, wherein said protective covers also comprise one or more inflatable non-stretchable regions.

4. The purge dam apparatus of claim 1, wherein said stretchable material comprises a stretch fabric having a stretch capability of at least approximately 25-55%.

5. The purge dam apparatus of claim 1, wherein said stretchable material has a melting point of at least approximately 180° F.

6. The purge dam apparatus of claim 1, further including a first inflation purge gas conduit extending between said first port on said first purge bladder and said second port on said first purge bladder, said first inflation purge gas conduit providing a first inflation purge gas pathway through said first gas-receiving chamber that is apertured to allow a purge gas therein to flow into said first gas-receiving chamber.

7. The purge dam apparatus of claim 6, further including an auxiliary purge gas conduit extending substantially adjacent to said first inflation purge gas conduit between said first port on said first purge bladder and said second port on said first purge bladder, said auxiliary purge gas conduit providing an auxiliary purge gas pathway through said first gas-receiving chamber, and being non-apertured to prevent a purge gas therein from flowing into said first gas-receiving chamber.

8. The purge dam apparatus of claim 7, further including a second inflation purge gas conduit extending between said third port on said second purge bladder and an opposite side of said second purge bladder, said second inflation purge gas conduit providing a second inflation purge gas pathway through said second gas-receiving chamber, and being apertured to allow a purge gas therein to flow into said second gas-receiving chamber.

9. The purge dam apparatus of claim 8, wherein said first inflation purge gas conduit, said bridge conduit, and said second inflation gas conduit are adapted to carry said purge gas to inflate said first purge bladder and said second purge bladder, and to fill said weld zone, and wherein said auxiliary purge gas conduit is adapted to carry an auxiliary purge gas to help fill said weld zone.

10. The purge dam apparatus of claim 9, wherein said first inflation purge gas conduit and said auxiliary purge gas conduit are respectively provided by first and second passages of a dual passage conduit.

11. An inflatable purge dam apparatus for retaining purge gas around a weld zone, comprising:

a first inflatable purge bladder having a first interior gas-receiving chamber and defining a first port on one side thereof and a second port on another side thereof, said first port and said second port being aligned proximate to a central longitudinal axis of said first purge bladder;

a purge gas inlet for receiving a supply of purge gas at said first port on said first purge bladder to be carried through said first bladder to said second port on said first purge bladder;

a second inflatable purge bladder having a second interior gas-receiving chamber and defining a third port on one side thereof, said third port being aligned proximate to a central longitudinal axis of said second purge bladder;

a bridge conduit extending between said second port on said first purge bladder and said third port on said second purge bladder, said bridge conduit providing fluid communication between said first gas-receiving chamber and said second gas-receiving chamber;

said bridge conduit having a pressure-sensitive gas discharge valve operable to release a purge gas into a weld zone formed between said first purge bladder and said second purge bladder when said first purge bladder and said second purge bladder have been inflated with said purge gas to a predetermined sealing pressure that is effective to seal said weld zone; and an air vent conduit extending between said first port on said first purge bladder and said second port on said first purge bladder and providing an air vent pathway through said first gas-receiving chamber for venting air from said weld zone into said second port on said first purge bladder and through said first purge bladder to said first port on said purge bladder at an air outlet adjacent said purge gas inlet while maintaining fluid separation from said first gas-receiving chamber.

12. The purge dam apparatus of claim 11, further including a first inflation purge gas conduit extending substantially adjacent to said air vent conduit between said first port on said first purge bladder and said second port on said first purge bladder, said first inflation purge gas conduit providing a first inflation purge gas pathway through said first gas-receiving chamber, and being apertured to allow a purge gas therein to flow into said first gas-receiving chamber.

13. The purge dam apparatus of claim 12, further including a second inflation purge gas conduit extending between said third port on said second purge bladder and an opposite side of said second purge bladder, said second inflation purge gas conduit providing a second inflation purge gas pathway through said second gas-receiving chamber, and being apertured to allow a purge gas therein to flow into said second gas-receiving chamber.

14. The purge dam apparatus of claim 13, wherein said air vent conduit and said first inflation purge gas conduit are provided by a dual passage conduit comprising a first passage providing said first gas pathway and a second passage providing said air vent pathway.

15. The purge dam apparatus of claim 14, wherein said dual passage conduit comprises a generally circular outer surface, and wherein said first purge bladder is mounted to said generally circular outer surface at said first port and said second port.

16. The purge dam apparatus of claim 13, further including an auxiliary purge gas conduit extending substantially adjacent to said air vent conduit and said first inflation purge gas conduit between said first port on said first purge bladder and said second port on said first purge bladder, said auxiliary purge gas conduit providing an auxiliary purge gas pathway through said first gas-receiving chamber, and being non-apertured to prevent a purge gas therein from flowing into said first gas-receiving chamber.

17. The purge dam apparatus of claim 16, wherein said air vent conduit, said first inflation purge gas conduit, and said auxiliary purge gas conduit are provided by a triple passage conduit comprising a first passage providing said air vent pathway, a second passage providing said first inflation purge gas pathway, and a third passage providing said auxiliary purge gas pathway.

18. The purge dam apparatus of claim 17, wherein said triple passage conduit comprises a generally circular outer surface, and wherein said first purge bladder is mounted to said generally circular outer surface at said first port and said second port.

19. The purge dam apparatus of claim 11, wherein:

said first purge bladder and said second purge bladder each comprise an expandable inner purge gas retaining liner and a heat-resistant stretchable outer protective cover;

said protective covers comprising a stretchable material that is more heat-resistant than a material used for said gas retaining liners, said stretchable material being constructed to undergo variable stretching to increase a size of said first purge bladder and said second purge bladder as they are inflated with said purge gas to said sealing pressure; and said variable stretching being sufficient to allow said first purge bladder and said second purge bladder to form an effective weld zone seal at said sealing pressure in pipes of different NPS.

20. An inflatable purge dam apparatus for use with pipes of different nominal pipe size (NPS), comprising:

a first inflatable purge bladder having a first interior gas-receiving chamber and defining a first port on one side thereof and a second port on another side thereof, said first port and said second port being aligned proximate to a central longitudinal axis of said first purge bladder;

a second inflatable purge bladder having a second interior gas-receiving chamber and defining a third port on one side thereof, said third port being aligned proximate to a central longitudinal axis of said second purge bladder;

a bridge conduit extending between said second port on said first purge bladder and said third port on said second purge bladder, said bridge conduit providing fluid communication between said first gas-receiving chamber and said second gas-receiving chamber;

said bridge conduit having a pressure-sensitive gas discharge valve operable to release a purge gas into a weld zone formed between said first purge bladder and said second purge bladder when said first purge bladder and said second purge bladder have been inflated with said purge gas to a predetermined sealing pressure that is effective to seal said weld zone;

a first inflation purge gas conduit extending between said first port on said first purge bladder and said second port on said first purge bladder, said first inflation purge gas conduit providing a first inflation purge gas pathway through said first gas-receiving chamber that is apertured to allow a purge gas therein to flow into said first gas-receiving chamber;

an auxiliary purge gas conduit extending substantially adjacent to said first inflation purge gas conduit between said first port on said first purge bladder and said second port on said first purge bladder, said auxiliary purge gas conduit providing an auxiliary purge gas pathway through said first gas-receiving chamber, and being non-apertured to prevent a purge gas therein from flowing into said first gas-receiving chamber;

a second inflation purge gas conduit extending between said third port on said second purge bladder and an opposite side of said second purge bladder, said second inflation purge gas conduit providing a second inflation purge gas pathway through said second gas-receiving chamber, and being apertured to allow a purge gas therein to flow into said second gas-receiving chamber;

said first inflation purge gas conduit, said bridge conduit, and said second inflation gas conduit being adapted to carry said purge gas to inflate said first purge bladder and said second purge bladder, and to fill said weld zone, and said auxiliary purge gas conduit being adapted to carry an auxiliary purge gas to help fill said weld zone;

an air vent conduit extending between said first port on said first purge bladder and said second port on said first purge bladder, and providing an air vent pathway through said first gas-receiving chamber for venting air from said weld zone through said first purge bladder while maintaining fluid separation from said first gas-receiving chamber;

said first purge bladder and said second purge bladder each comprising an expandable inner purge gas retaining liner and a heat-resistant stretchable outer protective cover;

said protective covers comprising a stretchable material that is more heat-resistant than a material used for said gas retaining liners, said stretchable material being constructed to undergo variable stretching to increase a size of said first purge bladder and said second purge bladder as they are inflated with said purge gas to said sealing pressure; and said variable stretching being sufficient to allow said first purge bladder and said second purge bladder to form an effective weld zone seal at said sealing pressure in pipes of different NPS.

\* \* \* \* \*